Patented Feb. 28, 1933

1,899,817

UNITED STATES PATENT OFFICE

MORRIS C. MATT, OF PHILADELPHIA, PENNSYLVANIA, ASSIGNOR TO ABBOTTS DAIRIES, INC., OF PHILADELPHIA, PENNSYLVANIA, A CORPORATION OF MARYLAND

THERAPEUTIC MILK PRODUCT AND PROCESS OF MAKING SAME

No Drawing.   Application filed May 23, 1931.   Serial No. 539,640.

My invention relates to a new milk product containing bacillus acidophilus in active condition and in relatively large numbers, and more particularly it relates to a palatable acidophilus milk product of marked therapeutic value containing also active streptococcus lactis, the palatable nature of the product and its therapeutic value resulting from the cooperative action of the two types of active organisms existing in the product.

One object of my invention is to furnish a buttermilk product containing not only lactic acid bacteria, but also bacillus acidophilus, which product has excellent therapeutic value, due to the symbiosis or harmony existing between the two types of organisms, the presence of the one in no way deleteriously changing or affecting the potency and value of the product as regards the other.

A further object of my invention is to provide a milk product containing in active condition both lactic acid bacteria and bacillus acidophilus, the aroma and flavor of which are new and pleasing and unlike that of the individual components of the mixture, due to the associated action of the two types of organisms in the product.

Still another object of the invention is to provide a process by which buttermilk containing bacillus acidophilus may be prepared, and by which the characteristic taste of acidopholus milk products is completely destroyed and the beneficial value of both the buttermilk and the acidophilus milk is fully retained.

Other objects will be apparent from a consideration of the specification and claims.

Fermented milks have been in use since very early times, and of recent years considerable interest, both from a practical and scientific standpoint, has been directed to their use for therapeutic purposes. On the basis of mutual antagonism existing between many acid-forming bacteria and those of putrefaction, many investigators have suggested the possibility of combating auto-intoxication caused by the undue accumulation in the body of toxic substances emanating from the intestinal tract, by adding acid-forming bacteria with fermentable carbohydrates, to the diet of patients suffering from this condition. It was first demonstrated that lactic acid organisms inhibited the development of certain races of the proteus species, due to the increase in acid brought about by the lactic acid organisms and the lack of acid tolerance of the proteus organisms.

Buttermilk, produced by the activity of certain bacteria which form lactic acid by decomposing milk sugar (lactose), has been widely used for this purpose. The ability of forming acid from lactose and other sugars is possessed by many kinds of bacteria, but is so characteristic of a certain group that they are commonly spoken of as "lactic acid bacteria," which term includes a fairly well defined group of closely related varieties possessing in common several definite characteristics, such as bacterium guntheri, bacillus acidi lactici, and streptococcus lactis. The bacteria desirable in the production of cultured buttermilk may similarly be included under the species name, "Streptococcus lactis," a marked characteristic of which is their ability to convert milk sugar (lactose) into lactic acid without the formation of gas.

While the use of buttermilk has been somewhat successful, it is impossible to implant the active streptococcus lactis in the intestinal tract, since these bacteria are not adaptable to the complex conditions existing therein. Use, therefore, has been made of bacillus acidophilus, distributed in a confection medium, in powder and tablet form as a whey broth culture, and in sweet milk fermented solely by this particular organism. This distribution in sweet milk heretofore has been probably the best method from a therapeutic standpoint, but such a product is generally regarded as nonpalatable, since it has the taste characteristic of the bacillus acidophilus.

Bacillus acidophilus is one of the two bacilli forming the chief inhabitants of the intestines of infants that subsist entirely on mothers' milk. As the diet of the infant is changed and made more difficult of digestion, the predominating intestinal flora of the breast-fed child changes until finally, when the usual diet of the milk weaned child is reached, the intestinal population assumes more and more the character of that of the adult, and the bacillus acidophilus gradually disappears until its presence can be demonstrated only occasionally and in small numbers. The different types of bacilli which take the place of bacillus acidophilus include many which are fermentative and putrefactive, and which oftentimes assume a role that is harmful to the host. Bacillus acidophilus, on the other hand, is harmless and is neither putrefactive nor fermentative. By administering bacillus acidophilus products, such as bacillus acidophilus milk, with or without added lactose, the implantation and proliferation of the viable organisms in the intestinal tract are most rapidly accomplished.

The comparative unpalatableness of bacillus acidophilus milk has been a hindrance to their wide consumption and use. The product of the present invention is characterized by an improvement in the aroma and flavor of the milk product to such an extent that it is extremely palatable and pleasing. This marked improvement in flavor and the therapeutic potency constitutes such an advantage that the further use of bacillus acidophilus and the wider dissemination of the acidophilus principle or therapy are assured. The product of the present invention has definitely proven its curative value in the treatment of auto-intoxication and the various intestinal disorders, particularly constipation and diarrhea.

My invention contemplates the distribution of bacillus acidophilus through the medium of cultured buttermilk. This distribution of viable bacillus acidophilus in quantity in cultured buttermilk results in a product of pleasing aroma and taste by which it is possible to implant large numbers of viable bacillus acidophilus in the intestinal tract, and at the same time provide a nutritive beverage, easy of digestion, as well as of general systemic value. It has been found that the two types of organisms are in symbiosis or harmony, the presence of one in no way deleteriously changing or affecting the potency or value of the product with respect to the other. There results from such a combination a new and characteristic pleasing aroma and flavor unlike that of the individual components of the mixture, the creation of which is due to the co-operative or associated action of the two organisms. This new milk product, containing bacillus acidophilus and streptococcus lactis, is a very palatable beverage of high therapeutic value, as well as of high food value, since it contains practically all the wholesomeness of sweet milk.

The product of the present invention may vary widely in the bacillus acidophilus bacterial count, but in any event it will be of sufficient magnitude to furnish to the patient a very large number of viable organisms. In general, the product will contain at least fifty million viable bacilli acidophilus per cubic centimeter, and at times, may contain as high as three hundred million per cubic centimeter. The buttermilk which is associated with the bacillus acidophilus is of the type resulting from the fermentation of skimmed, or partially skimmed milk, by pure cultures of lactic acid bacteria. Since the effectiveness of the buttermilk is dependent more upon the quality of the curd and the degree of acidity than upon the number of viable organisms present, except insofar as it affects the other factors, the bacterial count of the streptococcus lactis is not of particular significance. The acidity of the product of the invention may range from .7% to .9%, but preferably is between .7% and .8% expressed as lactic acid. The product may contain butter fat in any desired amounts from a trace to five per cent, or even higher, but it has been demonstrated that the best product from the standpoint of palatableness is obtained when the butter fat content is from one and one-half per cent to two per cent. The product with this amount of butter fat is also non-fattening.

The buttermilk containing bacillus acidophilus may be prepared in any suitable manner; for example, the buttermilk may be produced by the fermentation of skimmed milk with streptococcus lactis, and thereafter cooled to a relatively low temperature. The bacillus acidophilus may be obtained by incubation in whey broth. After the growth of the organism has taken place, the whey broth culture may be placed in a supercentrifuge and a bacillus acidophilus bacterial concentrate obtained. The desired quantity of the bacillus acidophilus concentrate thus obtained may be added to a definite amount of the cooled cultured buttermilk and thoroughly mixed therewith. In most instances, however, it will be found preferable to produce the milk containing the bacillus acidophilus and the cultured buttermilk independently, and to blend the two together thereafter by thorough mechanical mixing.

By either method, the product may be made daily with ease, in contradistinction to the common practice of preparing the acidophilus milk for a period of two to three weeks before consumption. Refrigeration over such a length of time results in appreciable destruction of the bacillus acidophilus. In freshly made buttermilk containing bacillus acidophilus, the number of viable bacillus acidophilus present is very large. This increase in the number of viable organisms and the more palatable nature of the product as compared with acidophilus milks heretofore prepared creates a marked tendency for regular and increased consumption with more effective results.

In preparing the milk product according to the preferred method, the two fermented milks are fermented separately. The buttermilk is manufactured by skimming fresh, pure milk, which is then transferred (either by pump or by gravity flow) to a vertical glass-lined covered tank equipped with a heavily insulated jacket and an efficient mechanical stirrer. The construction of the tank permits the milk to be heated and cooled without removing it from the container, which is used not only as a pasteurizer, but also as an incubator for the milk.

The temperature of the skimmed milk is raised to 180° F. by means of hot water and steam in the jacket, as well as in the coil, where the latter is rotary and serves as stirrer or agitator. This temperature is maintained for one hour, following which the milk is cooled to 70°-72° F. The bulk starter or culture of streptococcus lactis is then added in the proportion of one-half to one pint of culture to every ten gallons of milk. The entire liquid body is well agitated, and then upon being brought to rest, allowed to incubate for a period of about sixteen hours or until a sample, upon analysis, shows a titratable acidity of 0.75% to 0.80% expressed as lactic acid, at which time the milk is well curdled. The curdled milk is then cooled immediately to about 45° F., or lower, and agitated thoroughly to break the curd into fine particles.

Herein throughout the specification and claims the term "streptococcus lactis" is employed to include the lactic acid bacteria or groups of bacteria capable of fermenting the sugar of milk (lactose) to form lactic acid.

In the manufacture of the milk containing the bacillus acidophilus, the fresh, clean milk is skimmed and placed in the equipment similar to that described for use in the preparation of the cultured buttermilk. The skimmed milk is first sterilized at a temperature of 210° F. for ninety minutes, using steam and hot water for this purpose. The milk is then quickly cooled to 100° F. and an inoculation of the bulk starter or culture of bacillus acidophilus is made in an amount approximately equal to two per cent by volume of the milk. The agitator is operated for about ten minutes to distribute the inoculum throughout the milk. The batch is allowed to incubate until a firm curd is obtained, which usually requires about sixteen to eighteen hours. In order to ascertain when the incubation period is completed, it is necessary to determine the acidity of the acidophilus milk. A sample is taken and tested; and when the acidity approximates .6% to .7%, and preferably between .64% and .68% expressed as lactic acid, cooling of the batch is immediately begun (with thorough agitation) to check further fermentation. The cooling is rapid until a temperature of 70° F. is reached, but is then retarded to render the organisms hardy and to acclimate them to adverse low temperature conditions. The cooling is continued until the milk reaches 45° F., the entire cooling period requiring about three hours. At the end of the cooling period and as a result of the prolonged agitation, the curd is broken up into very fine particles.

After the two fermented milks are cooled to a temperature in the neighborhood of 45° F., as hereinbefore described, they are mixed together in suitable proportions by means of an agitator. The mixing may take place in a glass-lined vertical tank in which one or the other of the milks have been prepared. Preferably, the buttermilk is added to the receptacle containing the bacillus acidophilus milk, in the ratio of three parts of the former to two parts of the latter. This proportion may be changed as desired; for example, the buttermilk and the milk containing the bacillus acidophilus may be mixed in equal proportions, or in the ratio of two parts of the former to one part of the latter, the exact proportions of the two milks depending upon the particular properties required in the final product. If an increase in butter fat is desired over that contained in the combined milks, pasteurized cream is added to the mixture in quantities sufficient to bring the fat content of the finished product to the desired percentage, such as, one and one-half per cent to two per cent.

After thoroughly mixing the combined milks, the agitator is brought to rest and the mixture is allowed to stand under refrigeration for twenty-four hours at 45° F. to 50° F., or the product may be bottled immediately after mixing and allowed to remain in the bottles for the same length of time and at the same temperature for the purpose of blending. If the blending takes place in the vat, the milk is thoroughly stirred prior to bottling.

It is to be observed that the optimum temperature for the growth and propagation of the bacillus acidophilus is approximately 98° to 100° F.; while that of the streptococcus lactis is approximately 70° F. In the specific process described, the propagation and fermentation of the two organisms is not carried out by one incubation, but, on the contrary, each organism is propagated separately and under the conditions best adapted for it. The propagation is continued in the separate receptacles until the bacillus acidophilus milk contains the desired bacterial count as shown by the degree of acidity and the cultured buttermilk has reached its desired acidity.

Thereafter the two milks are mechanically mixed and blended at a temperature (in the neighborhood of 45° F.) where no appreciable fermentation occurs with either organism. The palatable flavor, the acidity, and number of viable organisms in the final product are brought about by fermentation and by the blending action resulting from the mixing and subsequent twenty-four hours aging before use. While in the example, skimmed milk is utilized in the preparation of both the bacillus acidophilus milk and the cultured buttermilk, partially skimmed milk, or even whole milk may be employed if desired. The preferred method provides a process which is easy to control, as previously pointed out. However, other processes may be employed in the production of the buttermilk containing the bacillus acidophilus.

Considerable modification is possible in the bacterial count, the acidity, and butter fat content of the product of the invention, as well as in the methods employed in producing the same, without departing from the essential features of my invention.

I claim:

1. A therapeutic milk product comprising viable bacillus acidophilus distributed in cultured buttermilk containing viable streptococcus lactis, the bacillus acidophilus being present in a therapeutically effective amount.

2. A therapeutic milk product comprising viable bacillus acidophilus and viable streptococcus lactis distributed in milk, the bacillus acidophilus being present in a therapeutically effective amount.

3. A therapeutic milk product comprising at least fifty million viable bacillus acidophilus per cubic centimeter distributed in cultured buttermilk containing viable streptococcus lactis.

4. A therapeutic milk product comprising at least fifty million viable bacillus acidophilus per cubic centimeter distributed in cultured buttermilk containing viable streptococcus lactis, the acidity of the product being between .7% and .9% expressed as lactic acid.

5. A therapeutic milk product comprising at least fifty million viable bacillus acidophilus per cubic centimeter distributed in cultured buttermilk containing viable streptococcus lactis, the acidity of the product being between .7% and .9% expressed as lactic acid, and the butter fat content being between 1½% and 2%.

6. A palatable milk product comprising bacillus acidophilus milk containing viable bacillus acidophilus the bacillus acidophilus being present in a therapeutically effective amount blended in cultured buttermilk containing viable streptococcus lactis.

7. A palatable milk product comprising bacillus acidophilus milk containing at least fifty million viable bacillus acidophilus per cubic centimeter blended with cultured buttermilk containing viable streptococcus lactis, the acidity of the product being between .7% and .9% expressed as lactic acid.

8. The step in the process of preparing a therapeutic milk product which comprises thoroughly mixing together viable bacillus acidophilus and cultured buttermilk containing viable streptococcus lactis, the bacillus acidophilus being present in therapeutically effective amounts.

9. The step in the process of preparing a therapeutic milk product which comprises thoroughly mixing together milk containing viable bacillus acidophilus and cultured buttermilk containing viable streptococcus lactis, the bacillus acidophilus being present in therapeutically effective amounts.

10. The step in the process of preparing a therapeutic milk product which comprises mixing a milk, in which bacillus acidophilus has been propagated and in which said organisms are in a viable condition, with cultured buttermilk containing viable streptococcus lactis, the bacillus acidophilus being present in therapeutically effective amounts.

11. The process of preparing a therapeutic milk product which comprises mixing a milk, in which bacillus acidophilus has been propagated and in which said organisms are in a viable condition, with cultured buttermilk containing viable streptococcus lactis, the bacillus acidophilus being present in therapeutically effective amounts at a temperature below which there is no appreciable growth of the organisms, and thereafter thoroughly agitating the mass at said temperature.

12. The process of preparing a therapeutic milk product which comprises mixing skimmed milk, in which bacillus acidophilus has been propagated and in which said organisms are in a viable condition, with cultured buttermilk containing viable streptococcus lactis, the bacillus acidophilus being present in therapeutically effective amounts at a temperature below which there is no appreciable growth of the organisms, thoroughly agitating the mass at said temperature, and thereafter allowing the mixture to become blended through aging.

13. The process of preparing a therapeutic milk product which comprises mixing a milk, in which bacillus acidophilus has been propagated and in which said organisms are in a viable condition, with cultured buttermilk containing viable streptococcus lactis, the bacillus acidophilus being present in therapeutically effective amounts at a temperature in the neighborhood of 45° F., thoroughly agitating the mass at said temperature, and allowing the mixture to become blended through aging at a temperature in the neighborhood of 45° F. to 50° F.

14. The process of preparing a therapeutic milk product which comprises propagating bacillus acidophilus in skimmed milk until the acidity has reached approximately .6% to .7% expressed as lactic acid, culturing skimmed milk by streptococcus lactis until the acidity is between .7% and .9% expressed as lactic acid, cooling each of said prepared milks to a temperature below which there is no appreciable growth of either organism, and thereafter thoroughly mixing the two cooled prepared milks together, the bacillus acidophilus being present in therapeutically effective amounts.

15. The process of preparing a therapeutic milk product which comprises propagating bacillus acidophilus in skimmed milk until the acidity has reached approximately .6% to .7% expressed as lactic acid, culturing skimmed milk by stereptococcus lactis until the acidity is between .7% and .9% expressed as lactic acid, cooling each of said prepared milks to a temperature in the neighborhood of 45° F., and thereafter thoroughly mixing the two cooled prepared milks together, the bacillus acidophilus being present in therapeutically effective amounts.

16. The process of preparing a therapeutic milk product which comprises propagating bacillus acidophilus in skimmed milk until the acidity has reached approximately .6% to .7% expressed as lactic acid, culturing skimmed milk by streptococcus lactis until the acidity is between .7% and .9% expressed as lactic acid, cooling each of said prepared milks to a temperature below which there is no appreciable growth of either organism, thoroughly mixing the two prepared milks together, the bacillus acidophilus being present in therapeutically effective amounts, and thereafter allowing the mixture to become blended through aging at a temperature at which no appreciable fermentation takes place.

17. The process of preparing a therapeutic milk product which comprises propagating bacillus acidophilus in skimmed milk until the acidity has reached approximately .6% to .7% expressed as lactic acid, culturing skimmed milk by streptococcus lactis until the acidity is between .7% and .9% expressed as lactic acid, cooling each of said prepared milks to a temperature in the neighborhood of 45° F., thoroughly mixing the two prepared milks together, the bacillus acidophilus being present in therapeutically effective amounts, and thereafter allowing the mixture to become blended through aging at a temperature in the neighborhood of 45° F. to 50° F.

18. The process of preparing a therapeutic milk product which comprises propagating bacillus acidophilus in skimmed milk until the acidity has reached approximately .6% to .7% expressed as lactic acid, culturing skimmed milk by streptococcus lactis until the acidity is between .7% and .9% expressed as lactic acid, cooling each of said prepared milks to a temperature in the neighborhood of 45° F., thoroughly mixing the two prepared milks together, the bacillus acidophilus being present in therapeutically effective amounts, and thereafter allowing the mixture to become blended through aging for approximately twenty-four hours in the neighborhood of 45° F. to 50° F.

19. The process of preparing a therapeutic milk product which comprises propagating bacillus acidophilus in skimmed milk until the acidity has reached approximately .6% to .7% expressed as lactic acid, culturing skimmed milk by streptococcus lactis until the acidity is between .7% and .9% expressed as lactic acid, cooling each of said prepared milks to a temperature below which there is no appreciable growth of either organism, thoroughly mixing the two prepared milks together in such proportions that the resulting product will contain at least fifty million viable bacilli acidophilus per cubic centimeter and will have an acidity between .7% and .8% figured as lactic acid, and thereafter allowing the mixture to become blended through aging at a temperature at which no appreciable fermentation takes place.

20. The process of preparing a therapeutic milk product which comprises propagating bacillus acidophilus in skimmed milk until the acidity has reached approximately .6% to .7% expressed as lactic acid, culturing skimmed milk by streptococcus lactis until the acidity is between .7% and .9% expressed as lactic acid, cooling each of said prepared milks to a temperature in the neighborhood of 45° F., thoroughly mixing the two prepared milks together in such proportions that the resulting product will contain at least fifty million viable bacilli acidophilus per cubic centimeter and will have an acidity between .7% and .8% figured as lactic acid, and thereafter allowing the mixture to become blended through aging at a temperature at which no appreciable fermentation takes place.

MORRIS C. MATT.